United States Patent [19]

Gershon et al.

[11] Patent Number: 4,698,523
[45] Date of Patent: Oct. 6, 1987

[54] SERVO DATA DEMODULATOR

[75] Inventors: Eugen Gershon, Los Gatos; Rudolph J. Sterner, Cupertino, both of Calif.

[73] Assignee: Advanced Micro Devices, Inc., Sunnyvale, Calif.

[21] Appl. No.: 794,943

[22] Filed: Nov. 1, 1985

[51] Int. Cl.$^4$ .................. H03K 5/15; H03K 5/153; G11C 27/02

[52] U.S. Cl. .................. 307/351; 307/353; 328/151

[58] Field of Search ............ 307/351, 352, 353; 328/146, 147, 151, 149

[56] References Cited

U.S. PATENT DOCUMENTS

| | | | |
|---|---|---|---|
| 3,602,826 | 8/1971 | List et al. | 307/353 |
| 4,069,452 | 1/1978 | Conway et al. | 307/351 |
| 4,373,141 | 2/1983 | Sanders | 307/351 |

Primary Examiner—John Zazworsky
Attorney, Agent, or Firm—Patrick T. King; Ronald C. Fish; J. Vincent Tortolano

[57] ABSTRACT

There is disclosed herein a servo data demodulator for use in magnetic head positioning servo system for disk drives. The demodulator is comprised of a single peak detector which detects the maximum amplitude of the peaks in an input signal during specific times. A storage capacitor is used in the peak detector to store the peak level. This peak level is sampled a predetermined number of times during each data frame. Each sample is taken by a different sample and hold circuit, and the sequence of the samples is controlled by a timing generator. The capacitor of the peak detector is discharged by a switch controlled by the timing generator after each sample and before the next sample. The time delay before the first sample from the start of the frame and the sample time in the sequence is programmable by the user by setting certain inputs into the timing generator.

19 Claims, 18 Drawing Figures

SERVO DATA DEMODULATOR

BACKGROUND OF THE INVENTION

The invention pertains to the field of servo systems, and, more particularly, to the field of servo data demodulator circuits for disk drive head control servo systems.

Disk drive head control servo systems serve to move the read/write heads to the proper track in a seek mode, and to maintain the heads over the proper track during a tracking mode to read or write data. To do this function, the servo system needs to generate and process certain control signals which signal track crossings in the seek mode and positional error of the heads over the selected track in the tracking mode.

The positional error signal is generated by sampling a signal from a servo head which reads data from servo tracks. The magnitude of the peaks are then compared to generate a positional error signal which indicates the amount and direction of error between the actual head position and the desired head position over the selected track.

In the prior art, servo data demodulators consisted of four peak detectors coupled to the single input signal line through a multiplexer. The peak detectors were each connected to the input signal at a different time and detected the peak amplitude of the signal at that time. The outputs of the peak detectors were then compared by applying them to the inputs of differential amplifiers whose outputs represented the differences between selected peaks. These difference outputs could be used to generate the position error signals. Such an arrangement is shown in FIG. 1. Most current disk drive manufacturers who use closed loop head positioning use this multiple peak detector architecture.

This prior art approach had several problems. Chief among them was inaccuracy. The inaccuracy stems from several sources. First, the multiplexer switches would have to be switching transistors which are integrated and placed in series with the signal to be measured. This would cause an inaccuracy because of the offset voltage of the switching transistor, i.e., the collector to emitter saturation voltage if saturating bipolar transistors are used, would be imposed between the voltage source to be measured and the charge storage capacitor. This would change the detected peak by the offset voltage of the switch. If the switches were not matched, or the peak detectors were not matched, then the detected peaks would have indicated magnitudes which were not their true magnitudes. The result would be a position error signal which was erroneous when the peaks were compared by the difference amplifier.

A further problem with the prior art approach is the problem of discharging of the capacitor in the peak detectors. The voltage of the capacitor of the peak detector follows the input signal as it rises. When the input signal amplitude begins to fall, the peak detector "freezes" the voltage on the capacitor at the peak voltage. Once this occurs, the capacitor begins to discharge slowly. This discharge occurs because of leakage across imperfect switches and through the input impedance of following stages and because of a designed-in leakage to allow the capacitor to discharge to a low enough value to be able to detect the peak in the next frame sample window. The same is true for each of the four channels.

To get an accurate position error signal, the difference between the peak voltages of the adjacent channels must be detected. But since the peak voltage stored on each capacitor is decaying over time, and the comparison of A to B cannot occur until the B channel has been sampled some time after A has been sampled, the voltage on the capacitor of the peak detector for the A channel will have partially decayed by the time the B sample has been taken. This difference could be compensated for if the rate of decay was linear or known and predictable and the relative sampling times were known. However, the rate of decay of the capacitor must be fast enough so that the capacitor voltage decays to a low enough value so as to be lower than the next peak to be detected. Effectively, this requires the decay to be to the lowest expected value in the range of input voltages expected from the time of one sample by a peak detector and the next sample by the peak detector. If this were not so, the next peak would not be detected, i.e., if the capacitor's initial voltage was already higher than the peak input signal magnitude existing at the time of the sample. To insure that all peaks are detected, the prior art sometimes uses an adaptive rate of discharge to change the rate of discharge of each peak detector's capacitor to increase the rate of discharge for input signals which are rapidly decreasing or decrease the rate of discharge for input signals which are not decreasing rapidly.

This type of prior art approach creates several problems. First, since the rate of discharge is changing, the error created by the amount of discharge on the A channel before sampling by the B channel changes and cannot be corrected for unless complicated circuitry is designed to remember the rate of discharge on each channel between each frame and correct for that particular discharge amount before comparing the sampled peak to the peak of the adjacent, later sampled channel. Further, complicated circuitry must exist to sense the rate of decrease of the input signal and change the discharge rate on each channel to adapt it for the rate of input signal decrease from one frame to the next.

Another problem with the above noted prior art servo data demodulator architecture and method is the error spikes which are generated each frame in the position error signal when the heads are actually on track. This concept will be best understood by reference to FIGS. 2 and 3.

FIG. 2 shows the outputs, i.e., the voltages on the peak detectors A and B for one frame when the servo head is on track, while FIG. 3 shows the resulting position error signal derived by subtracting the B output from the A output. When the heads are on track, the position error signal is supposed to be zero. However, with the prior art structure, a small error spike representing a false position error will be generated every frame because of the arrangement of the components and the method of sampling used. The reason these error spikes are generated is because a continuous comparison is made of the peak detector outputs while the peak detector outputs of adjacent channels can be validly be compared only at the time of sampling by the peak detector which samples later in time.

When peak detector 1 detects the peak on the A channel, its output is compared immediately with the output of peak detector 2 for the B channel by the output differential amplifier DIFF AMP 1 at time t0. Because the B channel peak detector has not yet taken its sample, the capacitor C2 voltage will have decayed from whatever peak was detected during the last data frame. The position error signal PES1 at time t0 assumes an erroneous positive value V1 equal to the peak value detected by the A channel peak detector less whatever voltage is then on the capacitor C2 of the B channel peak detector at the time t0. This is the voltage V1 indicated at the time t0 in FIG. 3. Prior to the time t0 (except for the rise time to the voltage at time t0), the position error signal PES1 would be some false negative value V0 which is equal to the difference between the voltages on the A and B channel peak detector capacitors C1 and C2 as they decay in unison from whatever peaks that were detected during the last data frame.

As the voltage on the A channel storage capacitor C1 decays after the time t0, so does the voltage on the B channel peak detector capacitor C2 continue to decay at the same rate. The position error signal PES1 during this period will be approximately constant at the false positive value assumed at the time t0. At time t1, the multiplexer connects the B channel peak detector to the input signal, and the B channel peak detector begins to charge up as shown by the transition 20 in FIG. 2. At time t3, the B channel peak detector is fully charged to the peak value. As the voltage on the capacitor C2 rises, the position error signal PES1 decreases. At a time t2 when the voltages on the A and B channel peak detector capacitors C1 and C2 equal each other, the position error signal PES1 will be zero. From the time t2 to the time t3, the signal PES1 continues to decrease to some false negative value V2 equal to the difference in voltage between the voltage on the capacitor C2 and the voltage on the capacitor C1, i.e., the voltage V2 in FIG. 3. After time t3, the position signal remains constant and equal to the voltage V2 as the capacitors C1 and C2 discharge at equal rates.

The value V2 of the position error signal at the time t3 is the amount of the error caused by the exponential decay on the A channel peak detector capacitor C1 during the period from the time of the A channel sample to the time of the B channel sample since the correct position error signal when the heads are on track is supposed to be zero.

Further, If the peak detectors for channels A through D are not well matched, the peaks for the A and B samples may not be equal when they are supposed to be. Subtracting two supposedly equal peaks which are not actually equal leads to a false indication of a positioning error when there is no error. This can lead to the positioning mechanism moving the servo and data heads off the track center when they were correctly centered to begin with.

The resultant spike in the position error signal renders it invalid for part of the frame. Further, because it is a fairly narrow pulse, it has a broad noise spectrum which can create electromagnetic interference and be coupled into any linear circuits in the system as noise.

There has developed a need for a simple, yet accurate servo data demodulator which does not suffer from the above noted deficiencies.

SUMMARY OF THE INVENTION

The invention is an improved servo data demodulator which only uses one peak detector with a single storage capacitor and four sample and hold circuits. Each sample and hold circuit has a switch which connects it to sample the voltage on the peak detector storage capcitor at a predetermined time. Each sample and hold ciruit samples the peak detector capacitor at a different time. The storage capacitor for the peak detector is bypassed by a switch which is controlled by timing logic which also controls the switches coupling each sample and hold circuit to the storage capacitor of the peak detector. The timing logic causes the switch which bypasses the storage capacitor of the peak detector to open when it is desired to sample a peak. The switch bypassing the peak detector storage capacitor is left open for a period sufficient to ensure that the peak is captured. At the end of the window period, a switch coupling one of the sample and hold circuits to the storage capacitor of the peak detector is closed for a sufficient time to allow that sample and hold circuit to acquire the voltage on the capacitor. Thereafter, the switch connecting the first sample and hold circuit to the peak detector capacitor is opened and the first sample and hold circuit goes into the hold mode. Next, the switch across the peak detector capacitor is closed for a sufficient time to discharge the capacitor, and then is opened for another sample window. During this second sample window, the peak detector storage capacitor acquires the peak occurring during this sample window. Next a second sample and hold circuit is coupled to the peak detector storage capacitor in the same manner as was the first sample and hold circuit. The process then repeats itself for the remaining two sample and hold circuits, and the whole process repeats itself for every frame.

The structure and method of the invention eliminates the problems in the prior art for several reasons. First, the inaccuracy caused by the decay of voltage on the peak detector storage capacitor while waiting for the next channel peak detector to sample, is eliminated. This is because there is no need in the invention to cause a planned rate of decay for the peak detector storage capacitor. During each sample window, the peak detector detects the peak and this peak is sampled and held by a separate circuit. Thereafter, the peak detector storage capacitor is totally discharged in preparation for sampling during the next sample window while the sample and hold circuit holds the peak detected during the first window at a constant value subject to only a small "droop" intrinsic to the operation of the sample and hold circuit.

This architecture also eliminates the need for the complicated circuitry to detect the rate of decrease of the input signal and correspondingly adjust the rate of decay of voltage on the peak detector storage capacitor to ensure that the voltage on the capacitor will be low enough before the next sample window to detect the next peak.

Further, the invention eliminates the error spikes in the position error signal when the heads are on track since there is no decay on the storage capacitors of the sample and hold circuits. That is, when the heads are on track, the detected peaks on adjacent channels are equal, and these detected peaks are stored in the sample and holds from one frame to the next with very little if any loss in magnitude. Thus, even if differential amplifiers are coupled to the outputs of the adjacent channel sample and hold circuits, no error spike will occur in the "on track center" situation. This is true even if the output of the A channel sample and hold is subtracted from the output of the B channel sample and hold circuit immediately after the A channel sample window ends since the B channel sample and hold circuit will still be storing a peak of the same magnitude from the previous frame. Thus, the result of this subtraction will be zero, the correct on track position error signal.

Further, the source of error caused by the offset voltage across the switch in the signal path in the invention is eliminated in the invention. This is because the servo data demodulator controlling switches are not in series in the signal path. As will be seen from the discussion below, the switch for the peak detector is across the peak detector storage capacitor, not in series with the incoming signal. Further, the switches for the sample and hold circuits are not in the signal path, but outside a diode bridge coupled to two corners which are not in the signal path.

DETAILED DESCRIPTION OF THE PREFERRED EMBODIMENT

Figure 1:
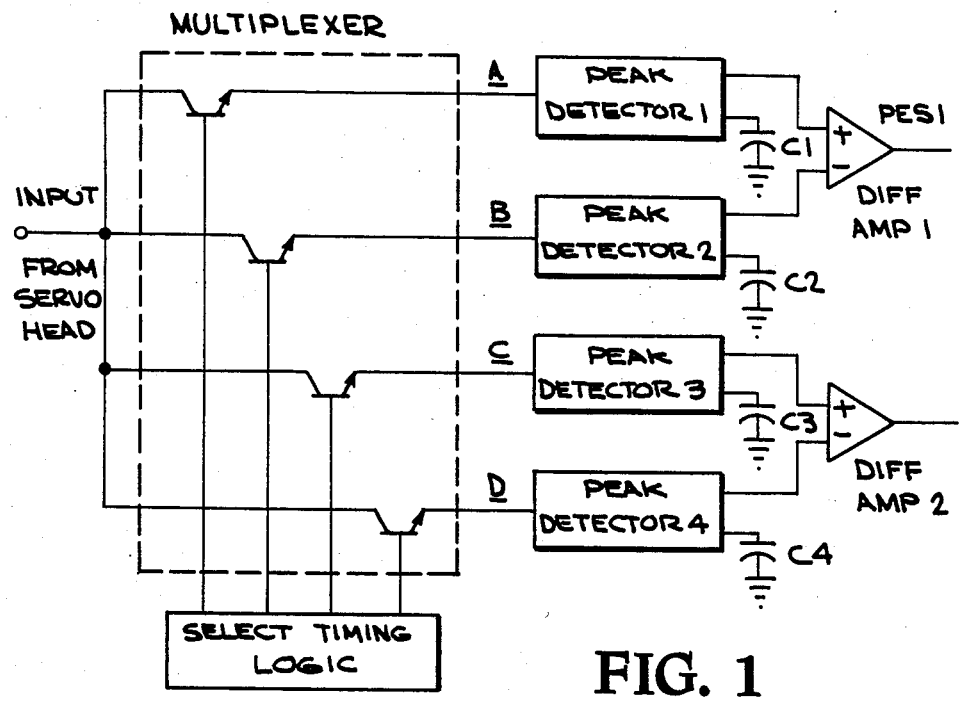
FIG. 1 is a block diagram of a prior art servo data demodulator.
Figure 2:
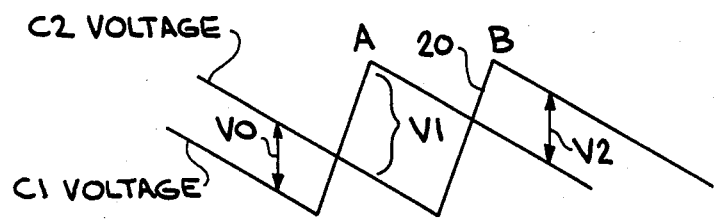
FIG. 2 is a timing diagram of the detected peak voltages for the A and B channels in the on track position.
Figure 3:
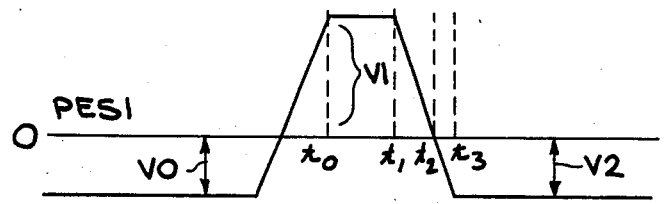
FIG. 3 is a timing diagram of the position error signal results from the detected peaks of FIG. 2.
Figure 4:
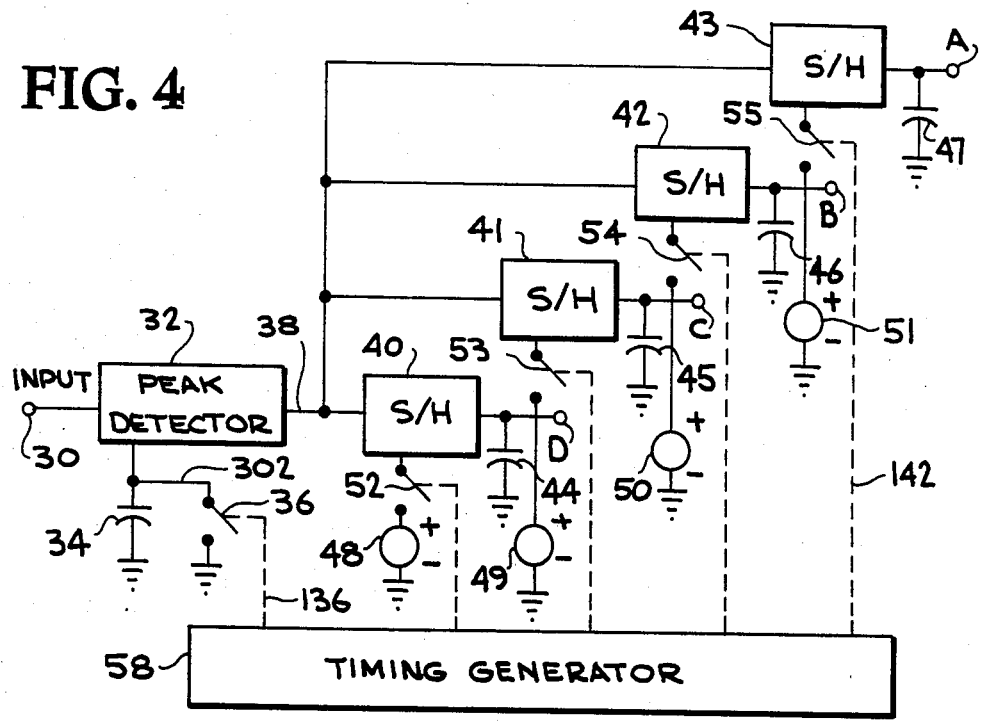
FIG. 4 is a block diagram of the preferred embodiment of the invention.

Referring to FIG. 4 there is shown a block diagram of the invention. The input signal from the servo data head or other signal source is applied to an input node 30. A single peak detector 32 having a storage capacitor 34 charges the capacitor 34 to track the input voltage on the node 30 to its highest level and "latches" at that highest level during a sample window even if the input voltage decreases while the sample window is still "open". The sample window duration is determined by a switch 36 which is connected across the storage capacitor 34 so as to discharge it when the switch 36 closes. When the switch 36 is open, the sample window is "open" and peak detection occurs. When the switch 36 is closed, the sample window is "closed" and the peak detector does not track the voltage on the input node 30.

The peak detector 32 can be of any conventional design which has an acquisition time sufficient to detect peaks in the input signals of interest. That is, the rate of change of the input signal must not exceed the maximum rate of change which can be followed by the peak detector. The switch 36 can be any type of electronic switch, but preferably is an integrated transistor switch.

The output of the peak detector 32 on line 38 is coupled to the inputs of four sample and hold circuits 40–43. Each sample and hold circuit has a storage capacitor, i.e., the storage capacitors 44–47, and each sample and hold circuit has a voltage source, i.e., the D.C. voltage sources 48–51, used for assisting in charging the storage capacitors in a manner which will be made clear below. Each voltage source can be connected or disconnected from its corresponding sample and hold circuit by one of the switches 52–55. The sample and hold circuits 40 through 43 must be closely matched in their electrical characteristics for high accuracy in the system. It is easier and more convenient to obtain matched sample and hold circuits by integration since then all transistors, diodes and resistors are formed in the same process and in close proximity on the same die. This eliminates many processing differences which can arise between different batches of the same type of device if discrete devices were used which processing differences, such as different doping concentrations or profiles, which can cause variations in the electrical performance of the devices. These differences in the components used to make the sample and hold circuits could cause the final sample and hold circuits to not be matched, thereby creating a need to sort through many sample and hold ciruits of the same design to find four circuits which are closely matched in their performance characteristics. Since this problem is essentially eliminated in integrated construction, and since it is easier and cheaper to build the entire circuit of FIG. 4 on a single integrated circuit die, this form of construction is preferred. However, the invention can also be practiced with other forms of construction as well such as by wiring together discrete components subject to the qualifications stated above. The switches 52–55 and the switch 36 are controlled by a timing generator 58 which will be described below.

Figure 5A:
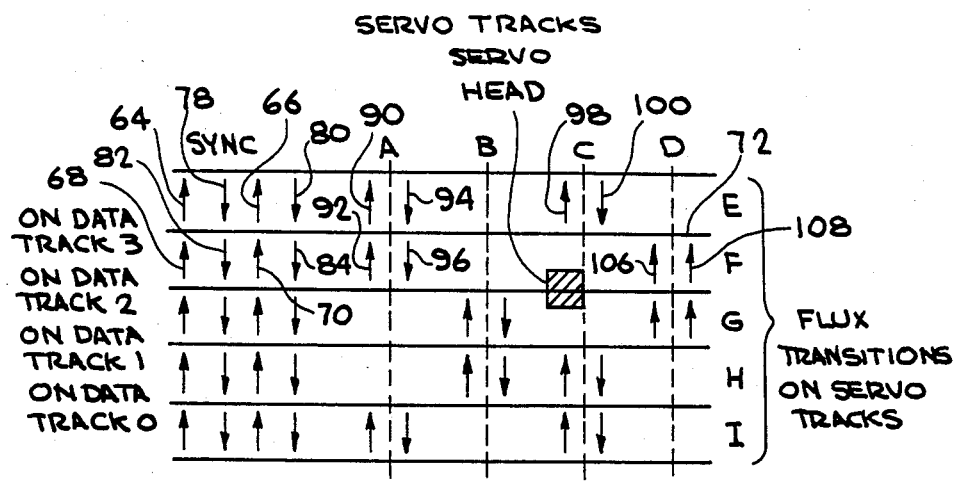
FIGS. 5A and 5B are diagrams of the flux transitions recorded on the servo tracks of a quadrature servo data system and timing diagrams of servo data signals which occur in each of the channels, i.e., time slots as the servo head moves over each track.
Figure 5B:
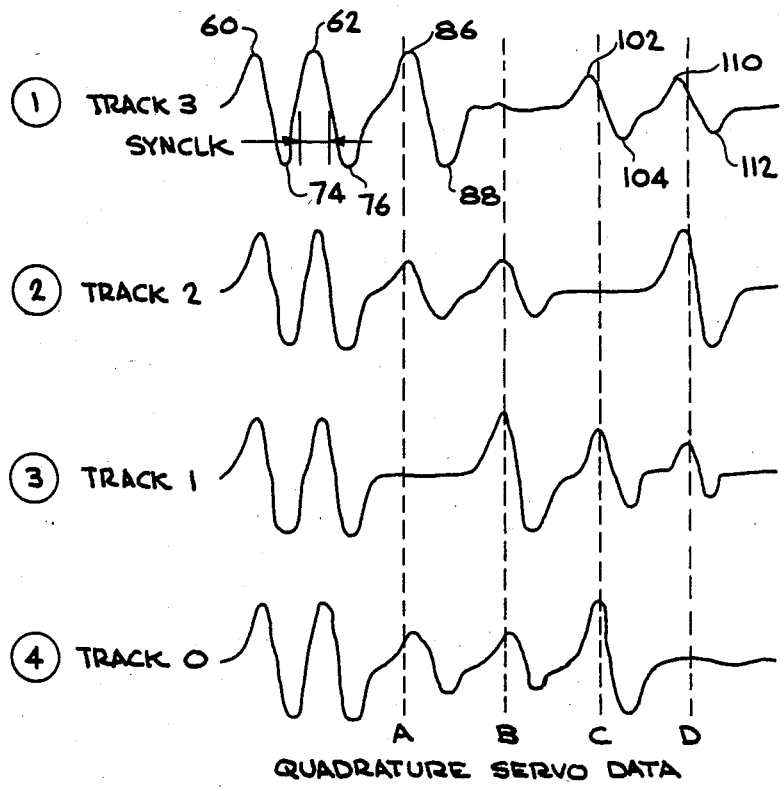
Figure 6A:
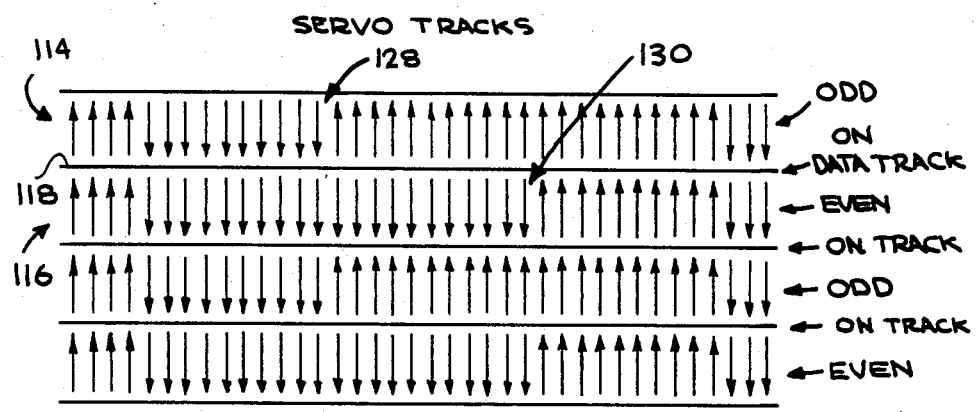
FIGS. 6A and 6B are diagrams of the flux transitions recorded on the servo tracks of a tri bit servo data system and timing diagrams of the servo data signals which occur in each of the channels, i.e., time slots as the servo head moves over each track.

In order to understand the manner of operation of the preferred embodiment of FIG. 4 to generate a position error signal, the reader should refer to FIGS. 5 and 6. These figures show the fixed, standard flux transitions recorded on the servo tracks of two commonly used servo systems for disk controllers. Such disk controllers control the radial positions of a set of magnetic heads which "fly" on a layer of air over the magnetic particle coated surfaces of several rapidly spinning disks. There is a servo head which flies over a magnetic disk surface having fixed servo data tracks recorded thereon, and there are data heads which fly over the surfaces of one or more data disks which have tracks of actual data recorded thereon. The disks are connected together and spin together about the same axis. The servo data does not change, and is used only for purposes of maintaining the heads in correct "on track" positions or to find a new track. The data on the data tracks is changeable, and it is read or new data is written on the data tracks at will. The several magnetic heads are mechanically joined together, and the servo tracks are offset by one half the width of a data track from the radial positions of the data tracks on the data bearing disk surfaces. Thus, the boundary between each two servo tracks is exactly vertically aligned with the center position of a data track. The servo controller moves the servo head, but in the process also moves the data heads. The purpose of the servo system of the disk controller in the track following mode is to maintain the servo head exactly centered over the boundaries between the two servo data tracks which have their boundary vertically aligned over the center of the data track to be followed. The correct position for the servo head for the data heads to be centered over a data track 2 (not shown) in FIG. 5 is as labelled in FIG. 5A. FIG. 5A shows the locations of the changes in the flux pattern only. The magnetic domains are not all shown. FIG. 6A shows all the magnetic domains, and flux transitions are shown where the directions of the arrows change.

Figure 6B:
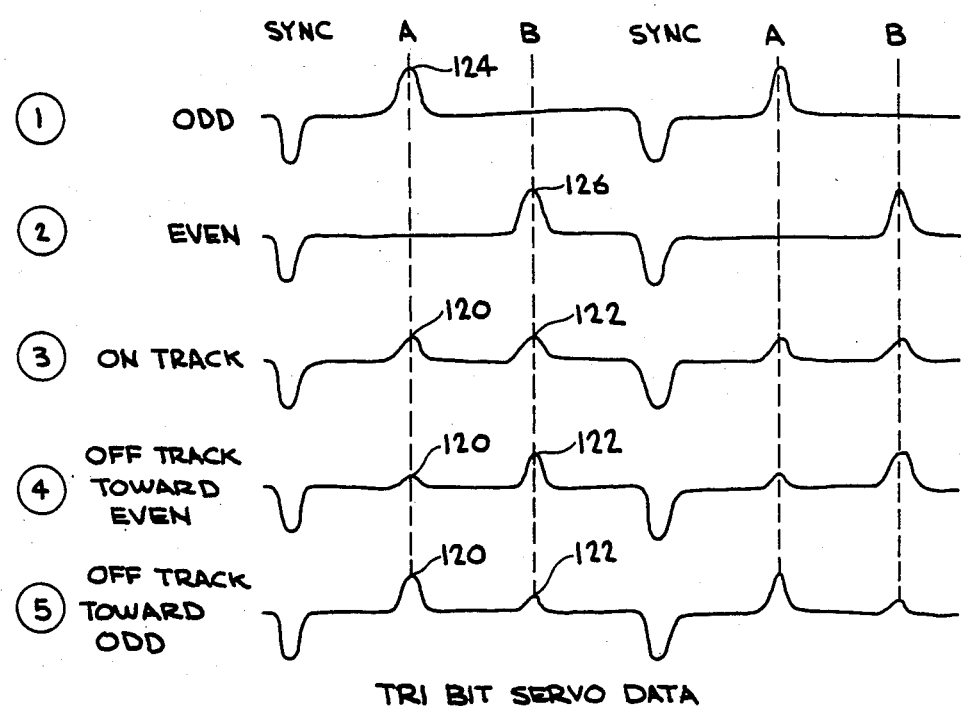

FIGS. 5B and 6B show timing diagrams for the signals which are present at the output of the servo head as it flies over the various tracks during the various windows, i.e., time slots during a frame of servo data.

Referring first to FIG. 5, the upper portion, 5A, shows a single frame of flux transitions on 4 servo tracks in the most commonly used system called the quadrature system. In this system each of 4 adjacent tracks has a different flux transition pattern recorded on it. The arrows indicate the direction of a particular transition. The timing diagrams below show the magnitude and polarity of the pulses at the output of the servo data head as it flies over the boundary between each two adjacent servo tracks. For example, the time line of FIG. 5B (1) shows two positive pulses 60 and 62 for the servo head aligned over the center of data track 3, i.e., aligned over the boundary between servo tracks E and F. The pulses 60 and 62 are generated as the servo head flies by the flux transitions 64 and 66 in the magnetic media on servo track E, and flux transitions 68 and 70 in the magnetic media on the servo track F. The center of the data track 3 is indicated by the line 72 representing the boundary between the servo tracks E and F. The two negative pulses 74 and 76 correspond to the servo head flying by the transitions 78 and 80 on servo track E and transitions 82 and 84 on servo track F. The pulses 60, 62, 74 and 76 are pulses in the synchronization portion of the frame. Each frame of data is divided into four time slots called A through D in the quadrature system. The centers of these windows are marked by dashed lines labelled A through D in FIG. 5.

Assume the servo head is centered over data track 3. As the disk moves relative to the servo head, a positive pulse 86 and a negative pulse 88 is generated by the effect of the magnetic flux transitions 90 and 92 and the effect of the transitions 94 and 96 on the servo head respectively. As the disk moves through window B, there are no pulses on time line 1 since there are no flux transitions in this window. Window C on track 3 has only a single set of flux transitions 98 and 100 which generate the pulses 102 and 104 respectively. Note how pulses 102 and 104 are only about half the amplitude of the pulses 86 and 88. This is because only a single flux transition on track E caused each of the pulses 102 and 104 while two transitions, one on servo track E and one on servo track F, caused each of the pulses 86 and 88. The two transition pulses have greater amplitude because the intensity of the changing magnetic flux is twice as great for the two transition pulses than for the one transition pulses. Window D on track 3 has only single transitions 106 and 108 which generate the pulses 110 and 112 on time line 1. A similar analysis can be performed on each of the time lines 2–4 to arrive at the signals shown for each track. Note how each of the signals on times lines 1–4 for each of the four tracks is unique after the sync portion of the frame. That is, the positions and amplitudes of the pulses in the servo head signal are unique for each track. By measuring the output of the servo head in each of the time slots and comparing the amplitudes of the detected pulses, a position error signal can be generated as will be appreciated by those skilled in the art.

FIG. 6A shows the flux transitions on the servo tracks of another common system used in disk controllers called the tri bit system. The signals on the time lines 1–5 indicate the signals from the servo head as it flies over the boundaries between servo tracks in various positions relative to the "on track" position, i.e., centered over the boundary. The flux transitions at 114 indicate the pattern of flux transitions recorded on odd servo tracks while the flux transitions at 116 indicate the flux transitions prerecorded on even servo tracks. As in the case of the quadrature system, these prerecorded flux transitions do not contain any data that changes. The servo data is data recorded in predefined flux transition patterns which are used by the servo head and positioning system to maintain the current head position and to monitor track crossings when seeking a new track.

Time line 1 in FIG. 6 indicates the servo head output when the head is flying over the center of an odd servo track such as 114 while time line 2 indicates the servo head output when the head is flying over the center of an even servo track such as 116. When the head is on track, i.e., flying along the boundary 118 between the odd and even tracks, the servo head outputs a signal as shown on the time line 3. Note that this signal has two pulses 120 and 122 in the channels A and B which are approximately half the amplitude of the pulses 124 and 126 respectively on the odd and even tracks in the A and B channels respectively. The reason is that the servo head is closer to the flux transition at 128 when it is flying directly over the center of the odd track 114 than when it is flying "on track" on the line 118. Since there is no corresponding flux transition on the even track 116 at the location on the even track corresponding to location 128 on the odd track, no reinforcement occurs from the even track. Since the intensity of the magnetic flux is a function of distance, less current flows in the servo head when it flies over a transition at a greater distance from the transition than when it flies directly over the transition at a closer distance. The same can be said for the comparison between the amplitude of the pulse 122 and the pulse 126 corresponding to the flux transition 130 on the even track without a corresponding transition on the odd track.

Time lines 4 and 5 illustrate the effects of a positional error in the location of the servo head relative to the "on track" position. Time line 4 indicates the effect of a positional error where the servo head is located of the on track position toward the even track. The effect is to decrease the amplitude of the pulse 120 and increase the amplitude of the pulse 122. The reason is the servo head is flying farther away from the transition 128 and closer to the transition 130 thereby changing the relative intensity of the magnetic flux changes experienced by the servo head as it flies by the transitions 128 and 130 thereby changing the amount of current each transition produces in the servo head windings. Time line 5 indicates the effects on the servo head output signal for a positional error toward the odd track. This case is where the servo head flies closer to the transition 128 and farther from the transition 130.

By sampling the servo head output at the times of the transitions 128 and 130, i.e., the windows or time slots A and B, and comparing the peak magnitudes of pulses existing during these time slots, a positional error signal can be derived. The purpose of the invention is to enable this sampling and storage of the peak magnitudes of the pulses occurring during the time slots A and B or A-D to enable a positional error signal to be generated in either the tri-bit or quadrature system.

Figure 7:
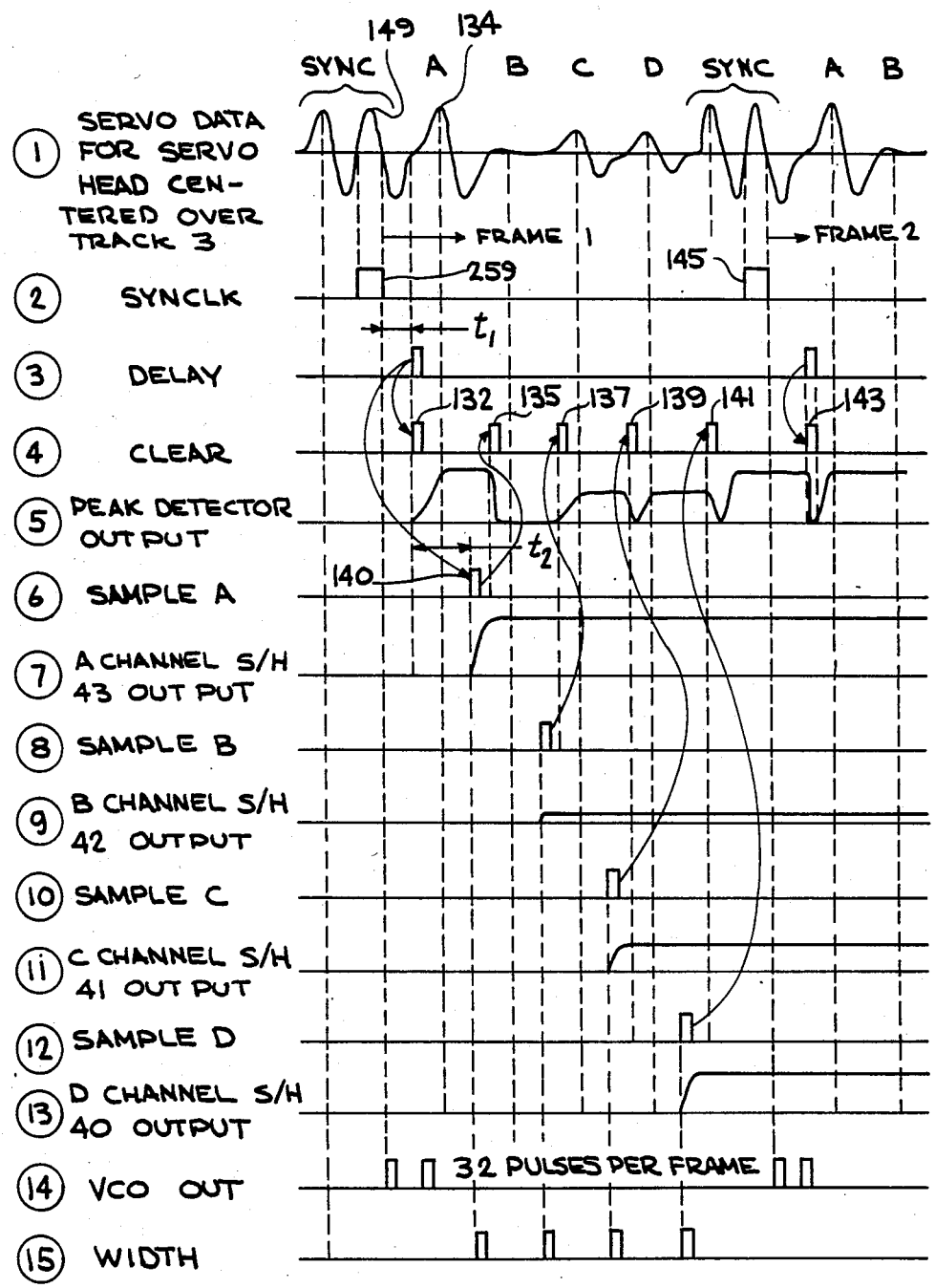
FIG. 7 is a timing diagram for the control signals which cause the invention to implement the process of the invention on the apparatus of the invention.
Figure 14:
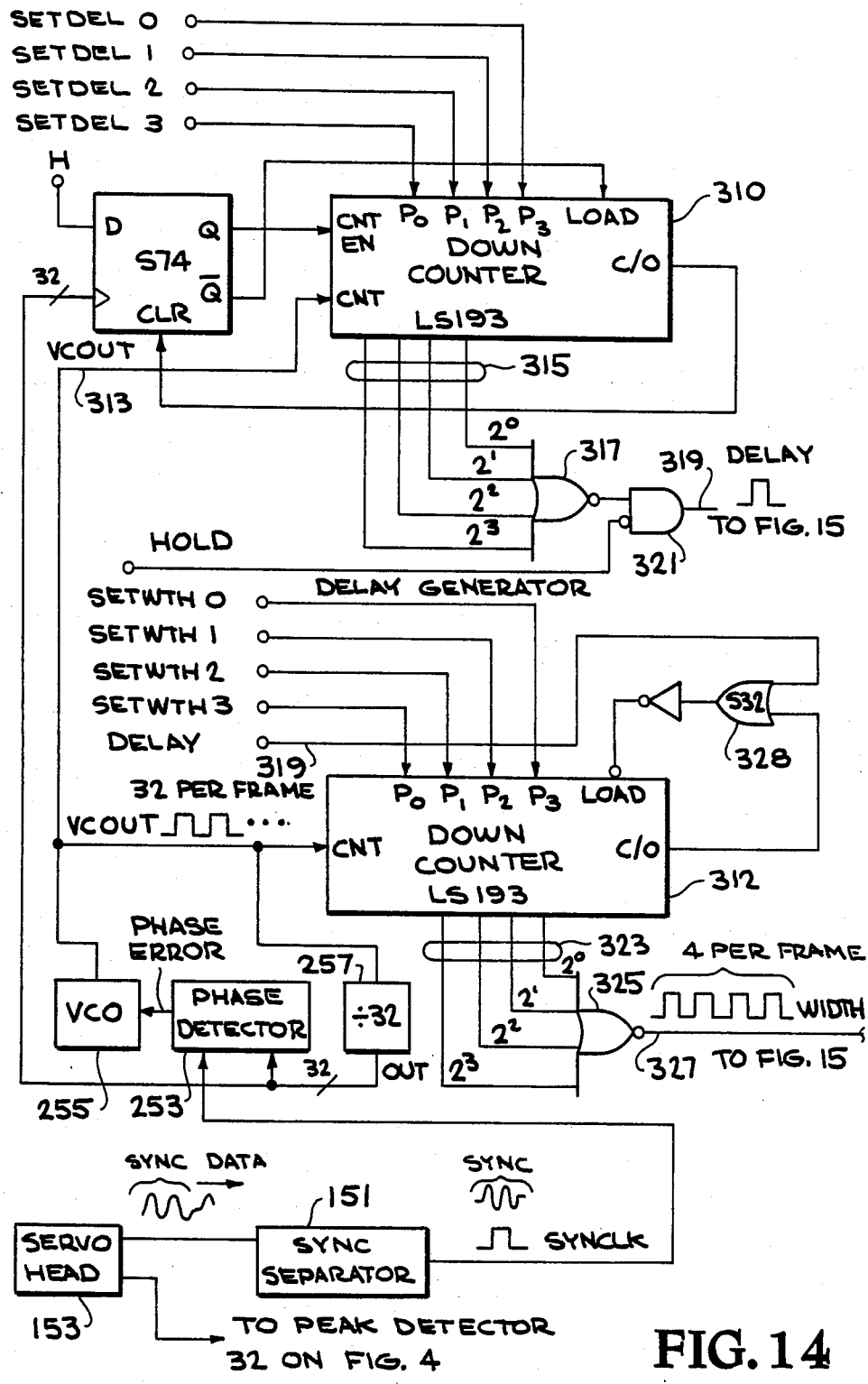

The manner in which this sampling and storage is done will be apparent from a study of FIG. 4 and FIG. 7. FIG. 7 illustrates the timing of the signals generated by the timing generator 58 of FIG. 4 to implement the process of the invention and the other timing relationships in the system. Time line 1 indicates the timing of a typical analog output signal from the servo head for the servo head centered over data track 3 in a quadrature system. Time line 2 illustrates the SYNCLK signal which is generated from the second pulse in each synchronization pulse pair, e.g., the sync pulse 149 for the first data frame illustrated in FIG. 7. The SYNCLK signal is generated by any conventional sync separator in a well known fashion. The coupling of the sync separator 151 to other elements of the system and to the timing generator 58 is illustrated in FIG. 14. The design of such sync separators is well known in the art, but generally such circuits are comprised of comparators having a threshold reference voltage connected to one comparison input and the analog signal from the servo head 153 connected to the other comparison input. The reference voltage is set at or near the 50% amplitude points of the sync pulses. The comparator generates one pulse for each pulse in the sync pulse pair, with the pulses having leading and trailing edges approximately coincident with the 50% amplitude points of the sync pulses. The comparator output is coupled to a monostable multivibrator (hereafter one shot) which is triggered by the first pulse in the pair and has a delay set to encompass the time of occurrence of the second pulse in the pair. The output of the comparator and the one shot are then ANDed, and the output signal is the SYNCLK signal. More detail about the operation of the circuitry of FIG. 14 will be given later in connection with discussion of the details of the timing generator 58 in FIG. 4. The purpose of the SYNCLK signal is to signal the start of the data frame.

One frame of data contains four data windows which have been labelled A, B, C and D in FIG. 7. The center of each window is marked by a dashed line labelled with the letter of the window and corresponds in time with the peak amplitude of the corresponding data pulse shown for the four windows in FIG. 5. Time line 4 illustrates the CLEAR pulses which represent the control signal on the line 136 in FIG. 4 controlling the open or closed state of the switch 36 which bypasses the storage capacitor of the peak detector. Each window represents a time when this switch 36 is open and the peak detector 32 is detecting peaks in the input analog signal illustrated on time line 1. Each clear pulse on the time line 4 represents a time when the switch 36 is closed thereby discharging the the capacitor 34. The A window is thus the time between the clear pulse 132 and a clear pulse 135. The B window is the time between the pulse 135 and a clear pulse 137. The C window is the time between the clear pulse 137 and a clear pulse 139. The D window is the time between the clear pulse 139 and a clear pulse 141. The clear pulse 143 represents the start of the A window for the next data frame following the SYNCLK pulse 145.

At the beginning of each peak detector window, the switch 36 is closed for a short period by one of the clear pulses on the time line 4. This discharges the capacitor 34 and insures that the capacitor 36 will have an initial voltage which is low enough to detect the magnitude of any pulse, however small. For example, the clear pulse 132 clears the capacitor 34 in preparation for the detection of the peak magnitude of the A window data pulse represented by the pulse 134. Time line 5 illustrates the voltage output on the output line 38 of the peak detector which is proportional to the voltage across the capacitor 34. This output voltage rises to the peak magnitude of the data pulse 134 and stays there until the next clear pulse 135. At that time, the output of the peak detector returns to the reference level.

After the A window data pulse 134 peak has been detected, it must be sampled and held for comparison with the pulse peak detected during the B window. To do this, a sample A pulse 140 is generated, as illustrated on time line 6, which is coupled to the switch 55 controlling the A channel sample and hold circuit 43 by the line 142. This short pulse causes the sample and hold circuit 43 to charge or discharge the capacitor 47 to the level of the voltage stored on the peak detector storage capacitor 34 and to hold that value as illustrated on time line 7. Next, the clear pulse 135 causes the switch 36 to close and clear the peak detector storage capacitor 34 in preparation for peak detection during the B window. The above processing sequence then repeats itself for each channel until all channels are peak detected and the magnitudes of the peaks are stored in the sample and hold circuits. The B, C and D window sample signals are illustrated on time lines 8, 10 and 12 respectively. The peak detector output during each of these windows is illustrated on time line 5. The resultant outputs of the B, C and D channel sample and holds, 42, 41 and 40 respectively in FIG. 4, are illustrated on time lines 9, 11 and 13 respectively. The position error signal can be derived from comparing the outputs of the sample and hold circuits for each channel in a manner understood by those skilled in the art.

Note that the sample and hold capacitors 44 through 47 are never cleared. These capacitors are either charged or discharged to the levels on the line 38 from their then current levels at the time the switches 52 through 55 are closed by the SAMPLE A through SAMPLE D signals. This simplifies the structure of the timing generator. The manner in which the sample and hold circuits function will become clear from the following discussion. The remaining time lines in FIG. 7 will be discussed in connection with the discussion of the details of the timing generator.

Figure 8:
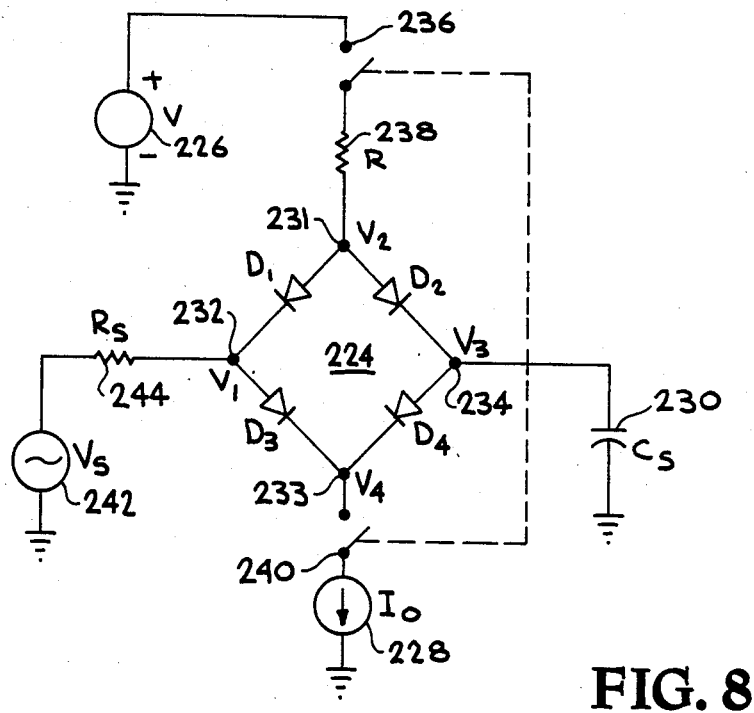
FIG. 8 is a schematic drawing of the sample and hold circuit of the invention.

Referring to FIG. 8, there is shown a schematic diagram of the sample and hold circuit of the invention. A diode bridge 224 serves to selectively couple a D.C. voltage source 226 and a current source 228 to a storage capacitor 230. The voltage source 226 corresponds to the voltage sources 48-51 in FIG. 4. The diode bridge has four nodes 231-234, with diodes $D_1$ and $D_2$ having their anodes coupled to the node 231 and their cathodes coupled to the nodes 232 and 234 respectively. Diodes $D_3$ and $D_4$ have their cathodes coupled to the node 233 and their anodes coupled to the nodes 232 and 234 respectively. The voltage source is coupled to the node 231 through a switch 236 and a resistor 238. The switch 236 corresponds to the switches 52–55 in FIG. 4. The current source 228 is coupled to the node 233 through a switch 240. This switch 240 is also symbolized by the switches 52–55 in FIG. 4. The storage capacitor is coupled between the node 234 and ground, and the voltage to be sampled is input to the node 232. A voltage source 242 supplying a voltage $V_s$ and having a source resistance 244 is shown as supplying the voltage to be sampled. In this case the voltage source 242 corresponds to voltage on the capacitor 34 of the peak detector 32.

The sample and hold circuit of FIG. 8 is designed to charge the capacitor 230 until the voltage at the node 234 equals the voltage existing at the node 232. This process begins at the time the switches 236 and 240 close. When the switches close, a selective coupling of the voltage source 226 and current source 228 occurs to the nodes 232 and 234 respectively depending upon the relative magnitude of the voltage $V_3$ at the node 234 and the voltage $V_1$ at the node 232. If $V_3$ is greater than $V_1$, the diodes $D_4$ and $D_1$ will be forward biased so as to be essentially shorts and the diodes $D_3$ and $D_2$ will be reversed biased so as to be essentially open circuits. The reason for this is that $V_4$ can be no greater voltage than one forward biased diode drop below $V_3$ and $V_3$ is greater than $V_1$. Thus $V_4$ will be greater than $V_1$ unless $V_1$ is within one forward biased diode drop of $V_3$, a special case which will be considered later. The diode $D_3$ is therefore reverse biased, while $D_4$ is forward biased. Likewise, the voltage $V_2$ is no greater than one forward biased diode drop above $V_1$, and $V_1$ is less than $V_3$ so the diode $D_2$ is reversed biased, while the diode $D_1$ is forward biased.

Figure 9:
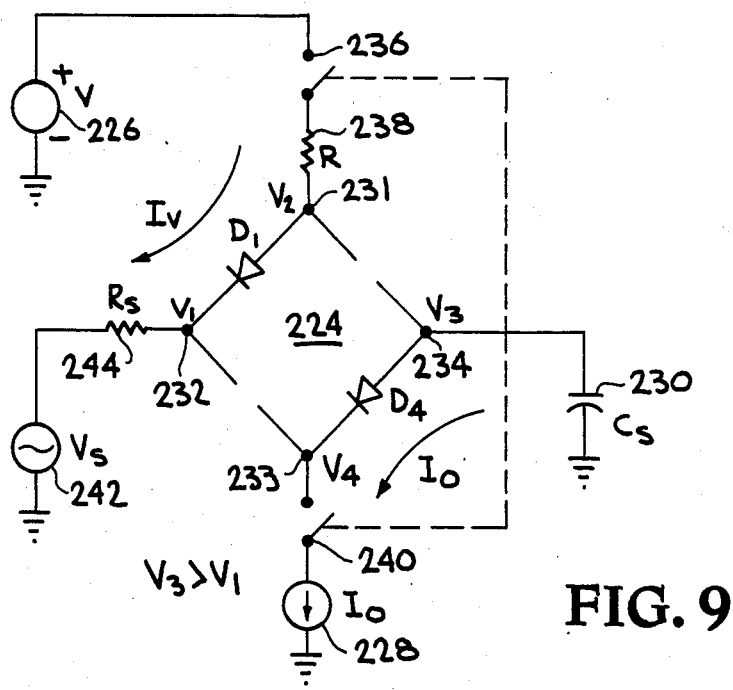
FIG. 9 is a diagram of current flow in the case where $V_3$ is greater than $V_1$.

The resultant current flow in the situation where $V_3$ is greater than $V_1$ is illustrated at FIG. 9 which shows the diodes $D_2$ and $D_3$ removed from the circuit. In this situation the capacitor 230 is selectively coupled to the current source 228 which draws a fixed current $I_O$ out of the capacitor 230 through the diode $D_4$ to reduce the voltage across the capacitor consequently reducing the voltage $V_3$ toward the level of the voltage $V_1$. The value of the current $I_O$ is established by the biasing and circuit elements used to implement the current source 228. Likewise, the voltage source 226 is selectively coupled to the input terminal 232 and supplies a current $I_v$ through the diode $D_1$ to the voltage source 242 of the voltage to be sampled. The current $I_v$ is equal to $(V-V_s)/(R+R_s)$. Since an ideal voltage source has a zero source resistance 244, the current $I_v$ flowing through the source resistance 244 will not alter the voltage $V_1$. Higher source resistances 244 will change the voltage $V_1$ slightly, so it is best to minimize the source resistance 244 to minimize the voltage difference between $V_s$ and $V_1$.

Acquisition time is the time that it takes for a sample and hold circuit to charge or discharge its capacitor such that the output voltage equals the voltage to be sampled. In the case of FIG. 9, the acquisition time can be tailored by establishing the value of $I_0$ relative to the capacitance $C_s$ of the capacitor 230 such that the capacitor can be charged or discharged to the maximum or minimum expected values for the voltage on the node 232 within the desired acquisition time. Note that the switches 236 and 240 preferably close together and must be closed for at least the acquisition time.

Figure 10:
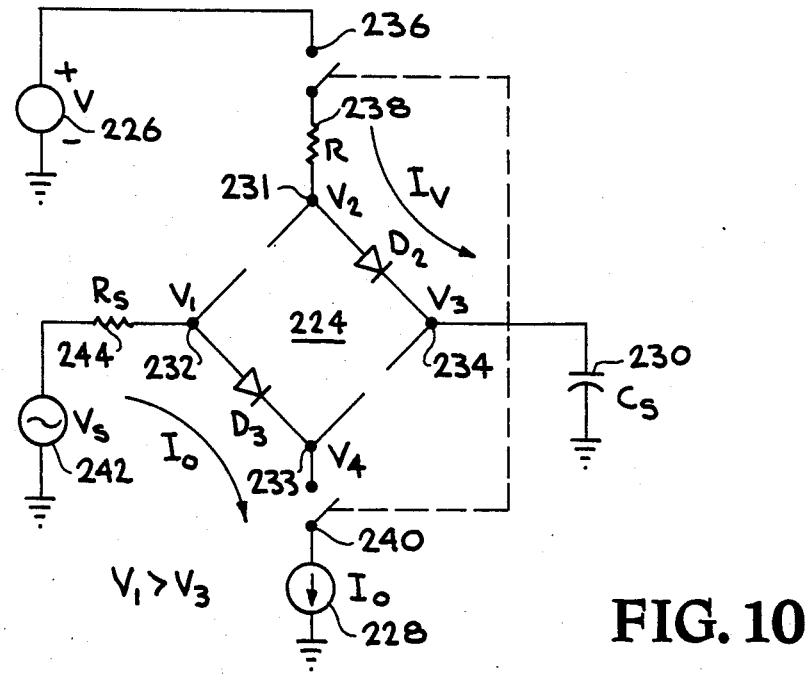
FIG. 10 is a diagram of current flow in the case where $V_1$ is greater than $V_3$.

If the voltage $V_3$ was less than the voltage $V_1$ when the switches closed, or if the capacitor 230 is discharged to the point that $V_3$ is less than $V_1$, then the situation depicted in FIG. 10 arises. In this situation the diodes $D_1$ and $D_4$ become reverse biased and disappear from the circuit, i.e., they act as open circuits. Conversely, the diodes $D_3$ and $D_2$ are forward biased, and act to selectively couple the current source 228 to the input terminal 232 and the voltage source 242 of the voltage to be sampled, and to couple the voltage source 226 through the resistor 238 and the diode $D_2$ to the capacitor 230. The capacitor 230 begins to charge as the current $I_v$ flows into it to cause the voltage $V_3$ to approach the voltage $V_1$. The voltage V from the voltage source 226, and the value R of the resistor 238 are selected such that the current $I_v$ is approximately matched to the value of the current $I_0$. The actual value of the current $I_v$ at any particular time equals $(V-V_2)/R$. Since $V_2$ swings over a voltage range related to the voltage swings of $V_1$ and $V_3$, the current $I_v$ also swings over a range. However, the values of R and V are picked such that V is greater than any expected $V_1$ and such that the current $I_v$ is equal to $I_0$ in the middle of its range.

In FIG. 10, the diode $D_3$ conducts a current $I_0$ drawn by the current source 228 out of the voltage source 242. If the source resistance 244 is sufficiently small, the voltage $V_1$ does not change appreciably as a result of this current flow $I_0$ through the source resistance 244.

As $V_3$ approaches $V_1$, the amount of current flow $I_v$ is defined by $(V-V_2)/R$. The current $I_v$ decreases as the voltage $V_2$ increases since $V_2$ follows $V_3$. With V much, much greater than $V_2$, the charging of capacitor 230, and the rise of $V_3$ are almost linear with time. The rise of voltage on a capacitor is $1/C$ times the integral of the current over the time of charging.

When $V_1=V_3$, $V_2$ is one diode drop above the voltages $V_1$ and $V_3$, while $V_4$ is one diode drop below $V_1$ and $V_3$. In this situation all diodes are forward biased, and the situation of FIG. 8 exists. Assuming ideal diodes, the diode bridge acts as a node in this case, and the current $(V-V_2)/R$ flows through the resistor into the bridge 224 and is divided between the two halves of the bridge, while the current $I_0$ flows out of the bridge 224 drawn by the current source 228. Any mismatch between $I_0$ and the current flowing through the resistor 238 flows into or out of the voltage source 242. No current flows into or out of the capacitor except for the current needed to replace lost charge due to leakages through the capacitor 230 and from the node 234 to the outside world. That this is true is self evident since if there were current of any appreciable magnitude flowing into or out of capacitor 230, then the voltage $V_3$ would be rising or falling away from the voltage $V_1$, and the situation would revert to the unbalanced bridge situation depicted in FIGS. 9 or 10. The capacitor would then charged or discharged until $V_3$ once again equalled $V_1$.

The leakage currents from the node 234 to the outside world and across the capacitor 230 represent a source of hold time drift after the switches 236 and 240 open since after these switches open, no further replacement of lost charge can occur from the voltage source 226. The leakages from the node 234 consist of any reverse bias junction leakage through the diodes, leakages through parasitic capacitances associated with the switches 236 and 240 and any leakage through the input impedance of the following stage coupled to the node 234 to read the voltage $V_3$ and do with it whatever is to be done.

Selection of the value for the capacitor 230 can be made such that its value is sufficiently large that these leakages during the hold time do not represent an intolerable error. Excessively large values for the capacitor 230 however, will increase the acquisition time unless a large current can be supplied from the current source 228 and the voltage source 226. It will be understood by those skilled in the art that the value of the resistor 238 should be kept as low as possible to minimize the acquisition time. The resistor 238 must be present however to allow the voltage $V_2$ to float in the range related to the range of $V_1$ and $V_3$. If the resistor 238 is not present, and the source resistance of the voltage source 226 (not shown) is not sufficiently high (ideally it is zero), then the voltage on the node 231 will be forced to be the voltage V which will prevent the diode bridge from working properly since diodes $D_1$ and $D_2$ will always be on thereby preventing the selective coupling action from occurring.

Note that in either of the cases presented in FIGS. 9 or 10, the current source 228 draws a current sourced from a voltage source and not another current source. Since voltage sources can supply substantially any current at a fixed voltage, there is no need for matching the currents of two current sources as in the case of the prior art. Thus there is no difficulty with artificial voltages being forced on the bridge, or unbalancing of the bridge caused by mismatched current sources causing errors in the sampling process.

Figure 11:
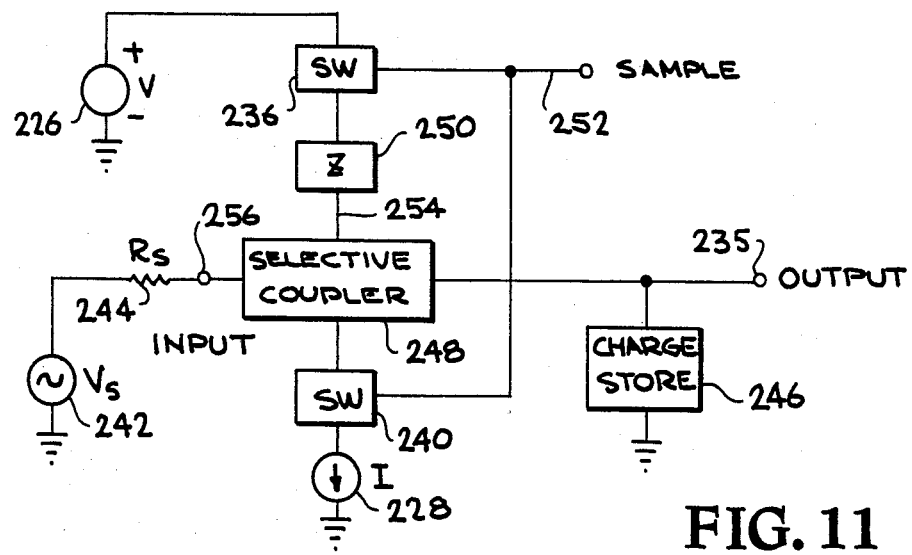
FIG. 11 is a schematic drawing of the most general sense of the sample and hold circuit of the invention to illustrate the functional relationships of each element and the relationships between the elements.

Referring to FIG. 11 there is shown the most general form of the sample and hold circuit. The embodiment shown in FIG. 11 functions to create an output voltage on a node 235 which is related to the charge stored in a charge storage device 246 such that greater charge stored translates into a higher output voltage. The charge storage means 246 can be any circuit which generates an output voltage which is related to the amount of current which has flowed into or out of the charge storage device 246 over the sample period while the switches 236 and 240 are closed. The switches 236 and 240 can be any devices which can switch the voltage source 226 and current source 228 into current communication with the selective coupler 248 upon receipt of a sample signal on the line 252. The switching speed of the switches should be significantly faster than the acquisition time.

The impedance 250 serves to control the amount of current flowing into the selective coupler 248 on the line 254 and to allow the voltage on the selective coupler node coupled to the line 254 to not be forced to the voltage V. The impedance should be a resistance as any inductive or capacitive portion of the impedance would lead to undesirable switching transients.

The selective coupler 248 functions to couple either the voltage source 226 or the current source 228 to the charge store 246 to increase to decrease the stored charge to cause the output voltage to match the voltage on the input terminal 256. The selective coupler can be any circuit that couples the voltage source 226 to the charge storage device 246 when the output voltage on the node 235 is less than the voltage on the input node 256 and which couples the current source 228 to the charge storage device 246 when the output voltage is greater than the input voltage at the start of the sampler period. In some embodiments of the selective coupler where the voltage on the node connected to the branch 254 does not matter to carry out the above function, the impedance 250 may be eliminated.

Figure 12:
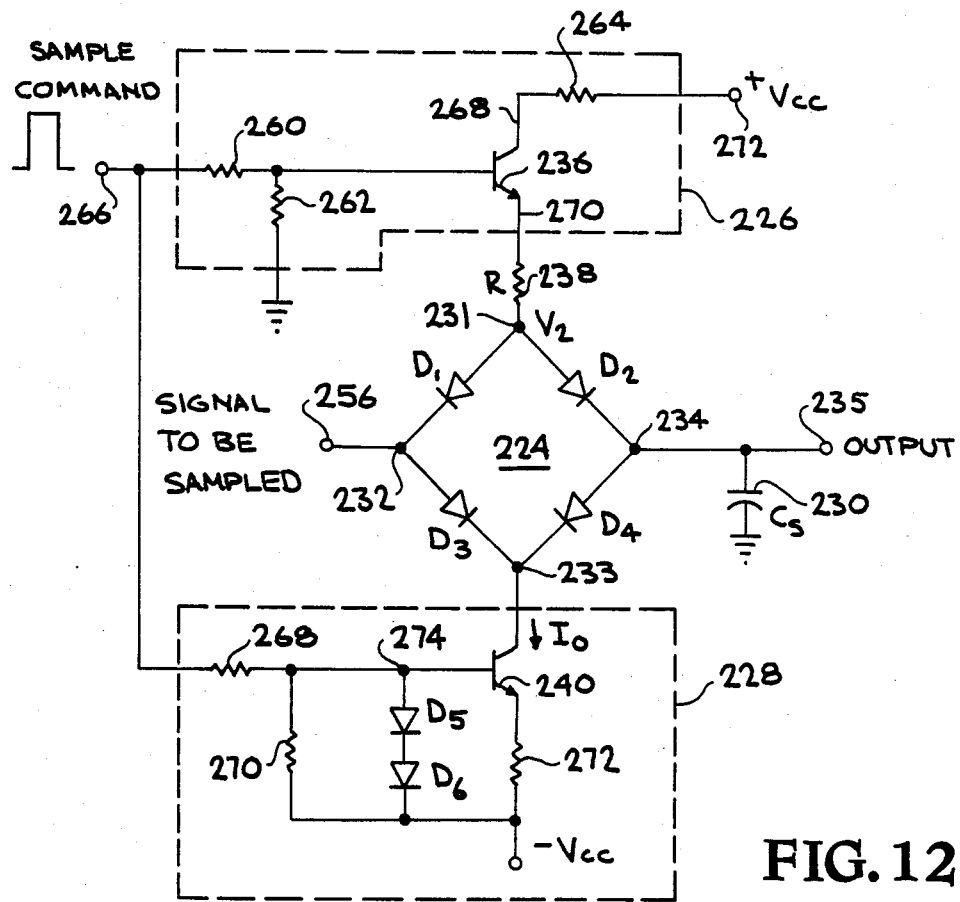
FIG. 12 is a schematic drawing of the preferred embodiment of the sample and hold circuit used in the invention.

Referring to FIG. 12 there is shown the preferred embodiment of the sample and hold circuit. The diode bridge 224 is the same structure as in the other embodiments and functions in the same way. The resistor 238 is the same and serves the same function. The voltage source 226 and the switch 236 are combined into a single NPN transistor 236. The bias level for the base drive of the transistor 236 is established by the resistors 260 and 262, and the collector load is established by the resistor 264. A sample pulse input 266 recives a sample pulse which is a positive going pulse of sufficient magnitude to drive the transistor 236 such that the emitter 270 is at a voltage which is much higher than the voltage $V_2$ at the node 231.

The switch 240 and current source 228 are replaced in FIG. 10 by the NPN transistor 240 and its associated circuitry. The transistor 240 is biased as a current source by the presence of the resistors 268 and 270, the diodes $D_5$ and $D_6$ and the emitter feedback resistor 272. The resistors 268 and 270 divide the sample pulse voltage to establish a base drive voltage on the base 274 of the transistor 240, and this base drive voltage is regulated to a temperature compensated base drive reference voltage equal to two forward biased diode drops by the diodes $D_5$ and $D_6$. This base drive establishes a fixed collector current which is drawn out of the node 233, which constant current is maintained constant by the negative feedback to the base emitter voltage of the transistor 240 caused by the presence of the resistor 272.

In the preferred embodiment of the sample and hold circuit, the transistors 240 and 236 are Schottky clamped bipolar transistors, but in other embodiments they could be FET's, gallium arsenide devices, Josephson junctions, ballistic effect devices, or other switching devices. The diodes $D_1$-$D_6$ are Schottky diodes in the preferred embodiment or other low minority carrier storage diodes for maximum switching speeds. With a value of 10 milliamperes for $I_0$ and a value of 20 picofarads for the capacitor 30, a change of voltage on the capacitor 230 of 0.5 volts per nanosecond is obtained which yields an acquisition time of 1 nanosecond for an input voltae excursion of plus or minus 1 volt.

Figure 13:
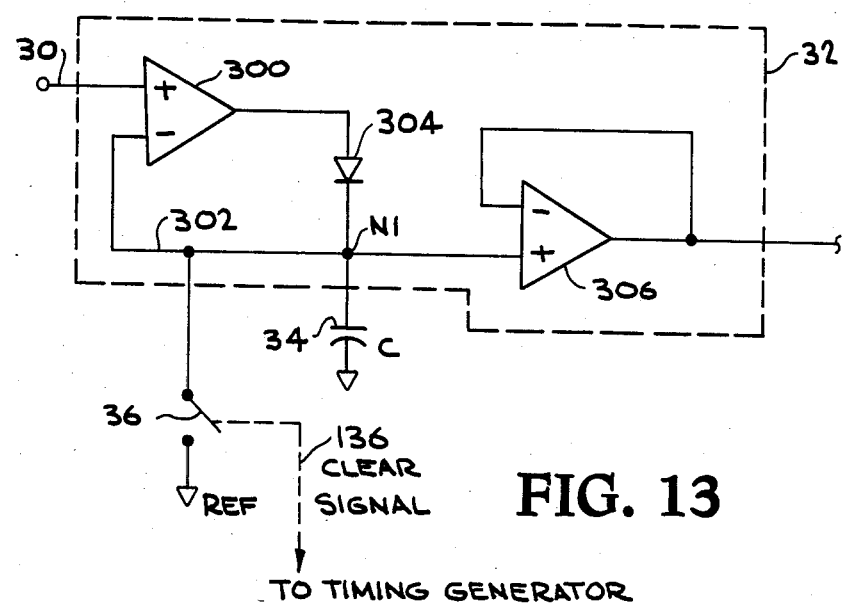
FIG. 13 shows one embodiment for a peak detector which can be used in the invention.

The design of the timing generator 58 in FIG. 4 is not critical to the invention as long as it can generate the signals of FIG. 7. The design of the peak detector 32 is also not critical to the invention as long as it can detect peaks having the rise time expected in the universe of possible input signals. One design for a peak detector which will work for practicing the invention is as shown in FIG. 13. In this embodiment, a differential amplifier 300 has its noninverting input coupled to the input node 30 and its inverting input coupled to the storage capacitor 34 by a line 302. The output of the amplifier 300 is coupled through a diode 304 to the capacitor 34. The capacitor 34 and the switch 36 both are coupled to a reference voltage source which is lower than any expected peak to be detected at the input node 30. The peak detector operates by amplifying the difference between the voltage across the capacitor 34 and the input voltage on node 30 and applying the output signal through the diode 304 to the capacitor 34. As long as the difference is positive, the voltage at the output of the amplifier 300 will be greater than the voltage on the node N1, and the diode 304 will be forward biased thereby continuing to charge the capacitor 34. When the voltage on the node 30 equals the voltage at the node N1, the difference will be zero, the output of the amplifier 300 will be zero, and the diode 304 will be reverse biased. The capacitor 34 will then remain charged to the highest voltage attained by the input as long as the switch 36 remains open. When the switch 36 closes, the capacitor 34 is discharged. A second differential amplifier 306 acts as a buffer to transmit the voltage on the capacitor without loading the capacitor down with a low shunt impedance. Other designs for peak detectors which are suitable are well known in the art.

Figure 15:
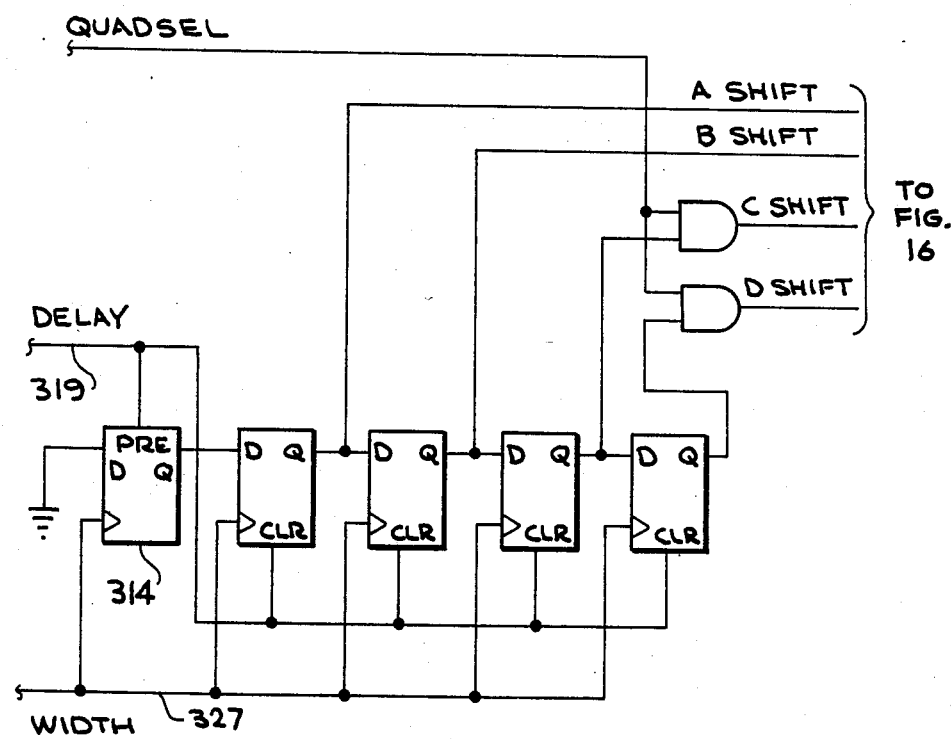
FIG. 14–16 show the logic for one embodiment of a user programmable timing generator which can be used in the invention.
Figure 16:
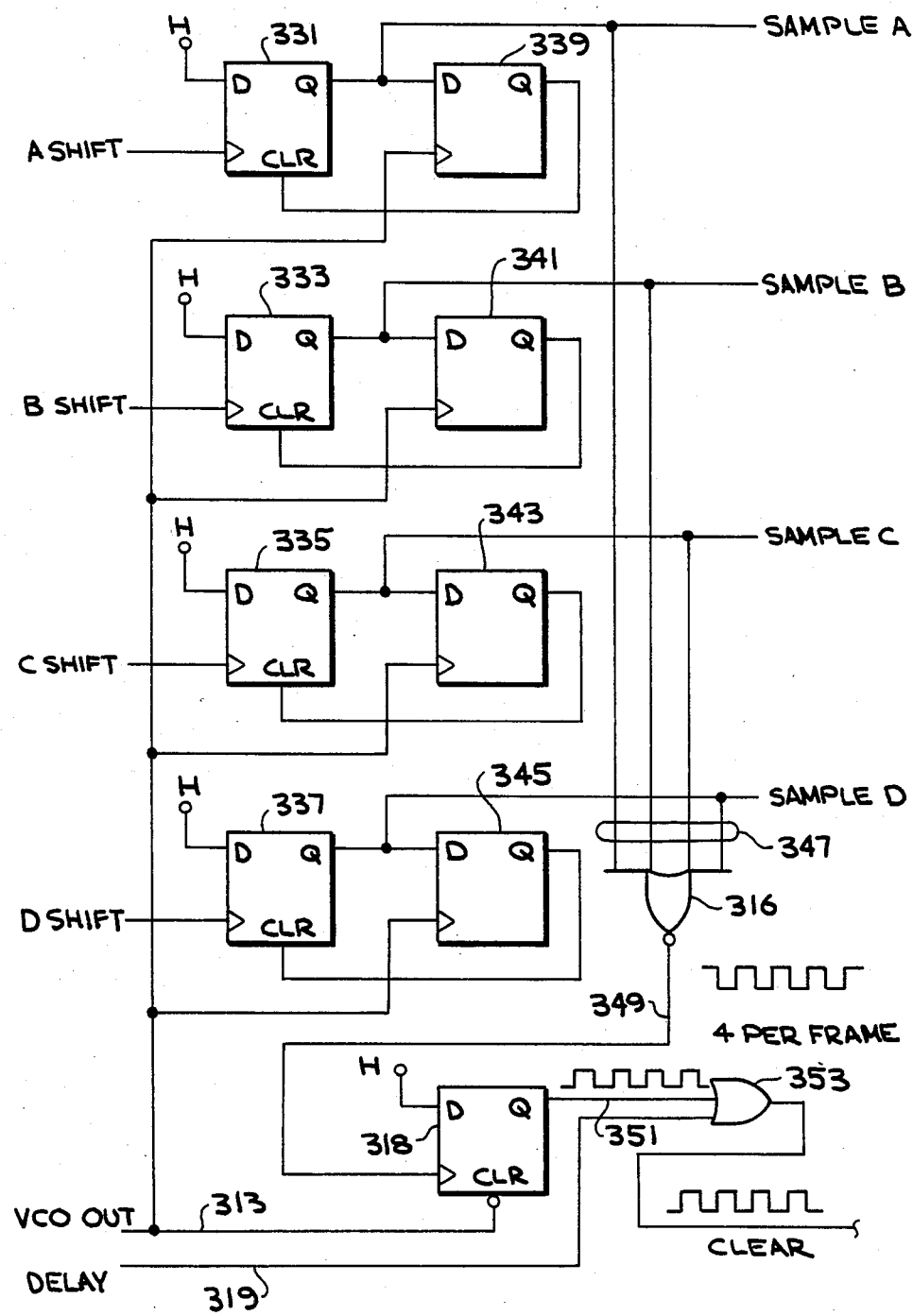

Any design for the timing generator which will deliver the signals illustrated in FIG. 7 in the sequence shown there will be adequate for purposes of practicing the invention. One embodiment for the timing generator 58 has the advantage of being programmable by a user to adjust for differing servo data structures. That embodiment is shown in FIGS. 14-16. FIG. 14 shows the logic which allows the user to program the delay between the beginning of the frame and the first sample enable signal, and the logic which allows the user to program the time between sample enable signals to the sample and hold circuits 40-43. The timing generator works by dividing the data frame illustrated in FIG. 7 into 32 segments which are sufficient to form the signals shown there. A clock signal VCOUT having 32 pulses per data frame is generated for the timing generator by a voltage controlled oscillator 255 of a phase locked loop. The design of such phase locked loops is well known to those skilled in the art. The voltage controlled oscillator in the phase locked loop is set to oscillate at 32 times the frame rate, and has an error voltage input which is coupled to a PHASE ERROR signal output from a phase detector 253. The phase detector has as its two comparison inputs, the SYNCLK signal from the output of the sync separator 151 and a /32 signal from the output of a divide by 32 counter 257. The input to the divide by 32 counter 257 is coupled to the VCOUT signal, so the output signal /32 occurs once per frame. The purpose of the phase detector 253 is to compare the phase of the /32 signal and the SYNCLK signal and generate the PHASE ERROR signal having its magnitude proportional to the amount of the phase error between the /32 and the SYNCLK signal. The design of such phase detectors is well known in the art. This PHASE ERROR signal causes the voltage controlled oscillator 255 to adjust the frequency of the VCOUT signal so as to tend to reduce the PHASE ERROR signal to zero. The VCOUT signal pulse train is illustrated on time line 14 in FIG. 7.

The user can program the amount of delay needed between the sync pulse, e.g., the sync pulse 149 for the first data frame as represented by the SYNCLK pulse 259 on time line 2 in FIG. 7, and the first sample pulse. This programmable delay is illustrated as a delay t1 on time line 3 in FIG. 7, and represents the amount of time between the start of the frame and the first CLEAR pulse on the time line 4. As will be seen below, the DELAY pulse and the CLEAR pulse are coincident in time for the CLEAR pulse 132. The programmability of the time delay t1 allows the user to tailor the system to different servo data structures.

Time line 3 in FIG. 7 shows the output pulse DELAY generated by a down counter 310 in FIG. 14. The user sets the time delay t1 (measured in terms of a number of VCO cycles in the VCOUT signal shown on time line 14) by setting the SETDEL 0 through 3 input signals at the proper binary levels to represent the number of binary counts to count before generating the DELAY signal. The counter 310 counts the number of VCOUT cycles on a line 313, and outputs a binary zero on a bus 315 when the count reaches zero. These logic zero levels on the lines in the bus 315 are input to a NOR gate which outputs a logic one for the VCO cycle when the number of VCO cycles encoded in the SETDEL 0 through 3 signals has been counted.

The user may also program the amount of delay between the each CLEAR signal and the sample signal for the window. This delay is designated t2, and it is illustrated on time line 6 of FIG. 7. The delay t2 is also measured in VCO cycles. The user controls the length of the delay t2 by programming the signals SETWTH 0 through 3 on FIG. 14 by encoding therein the number of VCO cycles in the VCOUT signal to be counted before the next sample signal is to be generated. The counter 312 on FIG. 14 is loaded with the user defined SETWTH 0 through 3 signals at the time of the DELAY pulse on a line 319. This DELAY pulse is coupled through the gate 328 to the load input of the counter 312 to cause loading of the user defined SETWTH 0 through 3 signals. The down counter 312 then counts down from the number loaded from the SETWTH 0-3 lines by counting the VCOUT cycles on the line 313. When the counter 312 reaches zero, it outputs all binary zeroes on a bus 323 which are converted to a logic one for one VCO cycle by the NOR gate 325. The output of the gate 325 is the WIDTH signal which is used to clock the shift register shown on FIG. 15 and is illustrated on time line 15 in FIG. 7. This signal occurs 4 times per frame of data for quadrature data, but it may occur fewer or more times per frame for other servo data structures.

Referring to FIG. 15, there is shown a shift register comprised of a number of D flip flops which have their clear inputs coupled to the DELAY signal on line 319 and which are clocked by the WIDTH signal on line 327. The DELAY pulse presets a logic 1 at the Q output of a flip flop 314. This logic 1 is clocked down the chain of flip flops by the WIDTH signal on the line 327. The WIDTH pulses coincide in time with the SAMPLE A through SAMPLE D signals on time lines 6, 8, 10 and 12 in FIG. 7. The Q outputs of the shift registers are used as the intermediate signals A SHIFT, B SHIFT, C SHIFT and D SHIFT with the C SHIFT and D SHIFT signals gated by a QUADSEL signal which is set by the user to pass the latter two signals only when quadrature format data is being used on the servo tracks.

The A SHIFT through D SHIFT output signals from the shift register of FIG. 15 are coupled to the logic on FIG. 16 which generates the SAMPLE A through SAMPLE D signals. The D flip flops 331, 333, 335 and 337 of FIG. 16 are clocked by the A SHIFT, B SHIFT, C SHIFT and D SHIFT signals and have their D inputs tied to a constant logic one. Thus as each of the A SHIFT through D SHIFT signals arrives, the Q output of the flip flop to which each of these signals is connected is set to logic one. These Q outputs are the SAMPLE A through D signals illustrated in FIG. 7.

The Q outputs of the flip flops 331, 333, 335 and 337 are coupled to the D inputs of the flip flops 339, 341, 343 and 345 which are clocked by the VCOUT signal. The Q outputs of the flip flops 339, 341, 343 and 345 are coupled back to the clear inputs of the flip flops 331, 333, 335 and 337 such that after each of the SAMPLE A through D signals occurs, the flip flops 339, 341, 343 and 345 are set on the next rising edge of VCOUT thereby resetting the flip flops 331, 333, 335 and 337.

All the sample signals SAMPLE A through SAMPLE D are gated through a NOR gate the output of which clocks a D flip flop 318 having its D input coupled to a constant logic one. The inputs on the bus 347 to the NOR gate 316 are all logic zeroes except for the times when each of the SAMPLE A through SAMPLE D signals briefly becomes a logic one. At each of these times, i.e., four times per frame, the output of the NOR gate 316 becomes a logic zero for a brief period. These negative going pulses on a line 349 clock the flip flop 318 on their rising edges thereby setting the Q output to a logic one. On the next transition of the VCOUT signal to logic zero, the flip flop 318 is reset. Thus each of the pulses SAMPLE A through SAMPLE D generates an individual CLEAR pulse on the Q output line 351 of the flip flop 318. These pulses are passed through an OR gate 353 to become the CLEAR pulses illustrated on time line 4 of FIG. 7. The OR gate 353 is also coupled to the DELAY signal on line 319 such that each DELAY signal also becomes a CLEAR signal which will be apparent from study of time lines 3 and 4 of FIG. 7.

Each sample signal is one VCO cycle long, and the CLEAR pulses are one half of a VCO cycle long. The rising edges of the output signals from the shift register, A SHIFT, B SHIFT, C SHIFT and D SHIFT, cause the SAMPLE A, SAMPLE B, SAMPLE C and SAMPLE D signals respectively to make the transition to logic one. Each SAMPLE "X" signal is reset at the next rising edge of the VCO output signal SYNCLK. This resetting action of SAMPLE "X" also triggers the CLEAR signal which resets at the falling edge of the SYNCLK signal. A HOLD signal on FIG. 14 will block transmission of the DELAY signal thereby causing all sample and hold circuits to maintain their present state. This HOLD circuit can be used to block sampling during times of invalid servo data in embedded servo data systems. When HOLD goes high, the output of the shift register is not affected until the next DELAY pulse. This means that the HOLD signal can be asserted asynchronously without affecting the validity of the data being generated during the frame when HOLD was asserted. When HOLD goes low, the shift register will not start until the next DELAY pulse. This insures that the timing generator output will cause sampling of a complete set of signals.

A first position error signal can be derived from subtracting the A and B channel sample and hold outputs from each other, and a second position error signal can be derived by subtracting the C and D channel sample and hold outputs from each other.

The advantages of the above described scheme over the prior art are that the sources of error are eliminated. First, there are no switches in series with the signals to be sampled so no switch offset voltage error occurs. Note how the switches 36 and 52-55 are not in the signal path. Second, there is no capacitor decay error since the peak detector sample capacitor is not used as the memory or storage capacitor since there is only one peak detector. The memory function is served by the sample and hold circuits which have very low decay or "droop" functions thereby minimizing this source of error. Third, the error spikes in the prior art architecture are eliminated since the sample and hold circuits always are storing at least their last stored value. Thus, even if the sample and hold outputs are constantly subtracted in a difference amplifier, there will be no spikes generated as in the prior art even though the data for the first position error signal will be valid only after the channel B sample has been taken and the second position error signal will be valid only after the D channel sample has been taken. That is, the position error signals will be valid after the B channel and D channel samples are taken, but will be invalid and constant until the next frame when they will jump to their next valid values.

Although the invention has been described in terms of the preferred embodiment above, those skilled in the art will appreciate that modifications can be made to the invention without departing from the true spirit and scope of the invention. All such modifications are intended to be included within the scope of the claims set out below.

What is claimed is:

1. An apparatus for sampling an input signal at different times for purpose of comparison of the magnitude of the signal at at least some of said different times comprising:
    a single means for detecting the peak amplitude of said signal at each of said different times; and
    plural means coupled to said single means for peak detecting for sampling and holding the peak voltages detected where each said means for sampling and holding samples the detected peak voltage at a corresponding one of said different times for purposes of comparison of the peak voltages detected during said at least some of said different times.

2. The apparatus of claim 1 further comprising an input for receiving said input signal wherein said single means for detecting is coupled directly to said input for receiving said input signal.

3. The apparatus of claim 2 wherein each of said means for sampling and holding comprises a sample and hold circuit, each continuously connected to the output of said means for peak detecting and each of which has switching means for activating the corresponding one of said sample and hold circuits only during a predetermined period, each said sample and hold circuit storing the sampled signal voltage on a capacitor and each sample and hold circuit having a negligible decay rate for the voltage on said capacitor during a predetermined cycle of sampling, and wherein said single means for peak detecting includes a peak voltage storage capacitor and switching means for discharging said peak voltage storage capacitor after detecting the peak of said input signal at each of said different times.

4. An apparatus for sampling an input signal at different times for purpose of comparison of the magnitude of the signal at different times comprising:
    means for detecting the peak amplitude of said signal at each of a plurality of times; and
    means for sampling and holding the peak voltages detected at said different times for purposes of comparison, wherein said means for sampling and holding comprises of a plurality of sample and hold circuits, each continuously connected to the output of said means for peak detecting and wherein each said sample and hold circuit comprises:
    a capacitor;
    a voltage source;
    a current source;
    an input terminal for receiving an unknown signal;
    means for selectively coupling said voltage source or said current source to charge or discharge said capacitor to the value of said unknown signal depending upon the relative magnitudes of the voltage of said unknown signal and the voltage across said capacitor.

5. An apparatus for sampling an input signal at different times for purpose of comparison of the magnitude of the signal at different times comprising:
means for detecting the peak amplitude of said signal at each of a plurality of times; and
means for sampling and holding the peak voltages detected at said different times for purposes of comparison, wherein said means for sampling and holding comprises of a plurality of sample and hold circuits, each continuously connected to the output of said means for peak detecting and wherein each said sample and hold circuit comprises:
a capacitor;
a voltage source;
a current source;
an input terminal for receiving an unknown signal;
means for selectively coupling said voltage source or said current source to charge or discharge said capacitor to the value of said unknown signal depending upon the relative magnitudes of the voltage of said unknown signal and the voltage across said capacitor, and wherein said means for detecting peaks comprises a single peak detector having a capacitor for storage of the detected peak and has a switch bypassing said capacitor for discharging it upon receipt of a clear signal.

6. An apparatus for sampling an input signal at different times for purpose of comparison of the magnitude of the signal at different times comprising:
means for detecting the peak amplitude of said signal at each of a plurality of times; and
means for sampling and holding the peak voltages detected at said different times for purposes of comparison, wherein said means for sampling and holding comprises of a plurality of sample and hold circuits, each continuously connected to the output of said means for peak detecting and wherein each said sample and hold circuit comprises:
a capacitor;
a voltage source;
a current source;
an input terminal for receiving an unknown signal;
means for selectively coupling said voltage source or said current source to charge or discharge said capacitor to the value of said unknown signal depending upon the relative magnitudes of the voltage of said unknown signal and the voltage across said capacitor, and
wherein said means for detecting peaks comprises a single peak detector having a capacitor for storage of the detected peak and has a switch bypassing said capacitor for discharging it upon receipt of a clear signal, and wherein each sample and hold circuit further comprises a switch means for enabling and disabling the operation of said sample and hold circuit.

7. An apparatus for sampling an input signal at different times for purpose of comparison of the magnitude of the signal at different times comprising:
means for detecting the peak amplitude of said signal at each of a plurality of times; and
means for sampling and holding the peak voltages detected at said different times for purposes of comparison, wherein said means for sampling and holding comprises of a plurality of sample and hold circuits, each continuously connected to the output of said means for peak detecting and wherein each said sample and hold circuit comprises:
a capacitor;
a voltage source;
a current source;
an input terminal for receiving an unknown signal;
means for selectively coupling said voltage source or said current source to charge or discharge said capacitor to the value of said unknown signal depending upon the relative magnitudes of the voltage of said unknown signal and the voltage across said capacitor, and
wherein said means for detecting peaks comprises a single peak detector having a capacitor for storage of the detected peak and has a switch bypassing said capacitor for discharging it upon receipt of a clear signal, and further comprising a timing means for causing said peak detector switch and said sample and hold switch means to be opened and closed in a predetermined sequence.

8. The apparatus of claim 7 wherein each sample is taken during a corresponding sample time slot where there are a plurality of such sample time slots comprising a sample cycle during each data frame of servo data on a disk drive servo data media where the start of each data frame is signaled by a sync signal recorded on said disk drive servo data media, and further comprising means in said timing means for allowing a programmable amount of delay between the start of each said data frame and the beginning of each said sample cycle.

9. The apparatus of claim 8 further comprising means in said timing means for allowing the user to program the duration of each said sample time slot.

10. The apparatus of claim 8 further comprising means in said timing means having a HOLD signal input for allowing the user to assert a HOLD signal asynchronously when servo data demodulation is not desired without affecting the sample data being generated by said apparatus during the servo data frame when said HOLD signal was asserted.

11. The apparatus of claim 8 wherein said timing means causes the voltage on said peak detector capacitor to be sampled a predetermined number of times during each data frame, and causes said peak detector storage capacitor to be charged to a predetermined voltage after each sample.

12. The apparatus of claim 11 wherein said timing means causes a predetermined number of said sample and hold circuits to sample the voltage on the storage capacitor of said peak detector once per data frame.

13. An apparatus for sampling and holding the peak voltages in an input signal at different times comprising:
a peak detector having a storage capacitor and coupled to said input signal for detecting peaks therein;
a clear switch for causing the voltage on said capacitor to be changed to a predetermined, fixed value upon receipt of a clear signal;
a plurality of sample and hold circuits coupled to said peak detector for sampling and holding the peak voltage detected at various times controlled by sample signals; and means for generating said clear and sample signals in a predetermined sequence.

14. The apparatus of claim 13 wherein said means for generating includes means for causing each of a predetermined number of said sample and hold circuits to sample the voltage on said peak detector storage capacitor a predetermined number of times during each data frame and for causing said storage capacitor to be charged to a predetermined voltage after each sample by one sample and hold circuit and before sampling by the next sample and hold circuit.

15. The apparatus of claim 13 wherein each sample is taken during a corresponding sample time slot where there are a plurality of such sample time slots comprising a sample cycle during each data frame of servo data on a disk drive servo data media where the start of each data frame is signaled by a sync signal recorded on said disk drive servo data media, and wherein said means for generating includes means for allowing the user to program predetermined times in said sequence and means for allowing the user to asynchronously stop the sampling operation of said apparatus by asserting a HOLD signal without affecting the validity of the sample data being generated during the servo data frame when the hold signal was asserted.

16. The apparatus of claim 13 wherein said sample and hold circuits include:
   an input terminal for receiving an input signal to be sampled;
   a charge storage means to create an output signal at an output terminal in proportion to the amount of charge stored therein;
   a current source;
   a voltage source;
   a resistor having one terminal coupled to said voltage source;
   a bridge means coupled between said input terminal and said charge storage means for selectively coupling either said current source or the other terminal of said impedance to said charge storage means depending upon the relative magnitudes of said input signal and said output signal to thereby change said output signal until it substantially matches said input signal.

17. A method of sampling the peak magnitude of a signal at different times comprising the steps of:
   charging a charge storage device in a single peak detector during selected periods in said input signal such that the voltage across said charge storage device approximately equals the peak voltage of said input signal during each of said selected periods;
   sampling and holding the voltage across said charge storage device at least once during each said period using plural sample and hold circuits each of which samples the peak voltage stored on said charge storage device during a corresponding one of said selected periods and holding the sampled voltage with substantially no decay over a predetermined sampled period; and
   discharging said charge storage device in said single peak detector at least partially after each said sampling and before the next sampling.

18. A method of sampling the peak magnitude of a signal at different times comprising the steps of:
   charging a charge storage device during selected periods in said input signal such that the voltage across said charge storage device approximately equals the peak voltage of said input signal during said selected periods;
   sampling and holding the voltage across said charge storage device at least once during each said period; and
   discharging said charge storage means at least partially after each said sampling and before the next sampling, and
wherein the step of sampling and holding includes the steps of:
   charging a capacitor from a voltage source when the voltage across the capacitor is less than the voltage to be sampled; and
   discharging the capacitor with a current source when the voltage across the capacitor is greater than the voltage to be sampled.

19. A method of sampling the peak magnitude of a signal at different times comprising the steps of:
   charging a charge storage device during selected periods in said input signal such that the voltage across said charge storage device approximately equals the peak voltage of said input signal during said selected periods;
   sampling and holding the voltage across said charge storage device at least once during each said period; and
   discharging said charge storage means at least partially after each said sampling and before the next sampling, and
wherein the step of sampling and holding includes the steps of:
   charging a capacitor from a voltage source when the voltage across the capacitor is less than the voltage to be sampled; and
   discharging the capacitor with a current source when the voltage across the capacitor is greater than the voltage to be sampled, and
further comprising the steps of causing each of the plurality of said capacitors to assume the voltage across said charge storage device where each capacitor is caused to assume the voltage across said charge storage means at a predetermined time.

* * * * *